United States Patent [19]

Miller

[11] Patent Number: 4,972,916
[45] Date of Patent: Nov. 27, 1990

[54] VEHICLE STEERING SYSTEM

[75] Inventor: Laurence L. Miller, West Lafayette, Ind.

[73] Assignee: TRW Inc., Lyndhurst, Ohio

[21] Appl. No.: 342,948

[22] Filed: Apr. 25, 1989

[51] Int. Cl.$^5$ .......................... B62D 5/04; B62D 5/097
[52] U.S. Cl. ...................................... 180/140; 60/387
[58] Field of Search ....................... 180/140, 141, 142; 280/91; 60/386, 387

[56] References Cited

U.S. PATENT DOCUMENTS

| | | | |
|---|---|---|---|
| 3,613,364 | 10/1971 | Goff | 60/387 |
| 4,069,743 | 1/1978 | Bertanza | 60/386 X |
| 4,232,708 | 11/1980 | Miller | 137/625.21 |
| 4,640,379 | 2/1987 | Shibanhata et al. | 180/140 |
| 4,657,102 | 4/1987 | Kanazawa et al. | 180/140 |
| 4,669,744 | 6/1987 | Sano et al. | 280/91 |
| 4,671,523 | 6/1987 | Naumann | 280/91 |
| 4,673,189 | 6/1987 | Kanazawa et al. | 280/91 |
| 4,703,822 | 11/1987 | Kawamoto et al. | 180/140 |
| 4,776,419 | 10/1988 | Walton | 180/140 |
| 4,828,283 | 5/1989 | Ishii et al. | 180/140 X |

OTHER PUBLICATIONS

Perlini 131-33.

Primary Examiner—Mitchell J. Hill
Attorney, Agent, or Firm—Tarolli, Sundheim & Covell

[57] ABSTRACT

A vehicle steering system having more than one set of steerable wheels includes a hydrostatic steering unit connected in fluid communication with actuatable hydraulic steering motors operatively coupled with one set of wheels. The hydraulic steering motors are actuated when hydraulic fluid is applied thereto. Steering movement of the one set of wheels is effected in response to actuation of the hydraulic steering motors. The hydrostatic steering unit has an input shaft drivingly connected with an output shaft of an electric motor. The speed and direction of rotation of the output shaft of the electric motor, and hence the speed and direction of rotation of the input shaft of the hydrostatic steering unit, is controlled in response to a control output signal from a microcomputer. The control output signal from the microcomputer is generated in response to the magnitude and direction of steering torque applied to the steering wheel, the vehicle speed, and the positions of the sets of steerable wheels. The flow of the hydraulic fluid to the hydraulic steering motors is proportional to the rotational speed of the input shaft of the hydrostatic steering unit. The direction of the hydraulic fluid flow depends upon the direction of rotation of the input shaft of the hydrostatic steering unit.

7 Claims, 2 Drawing Sheets

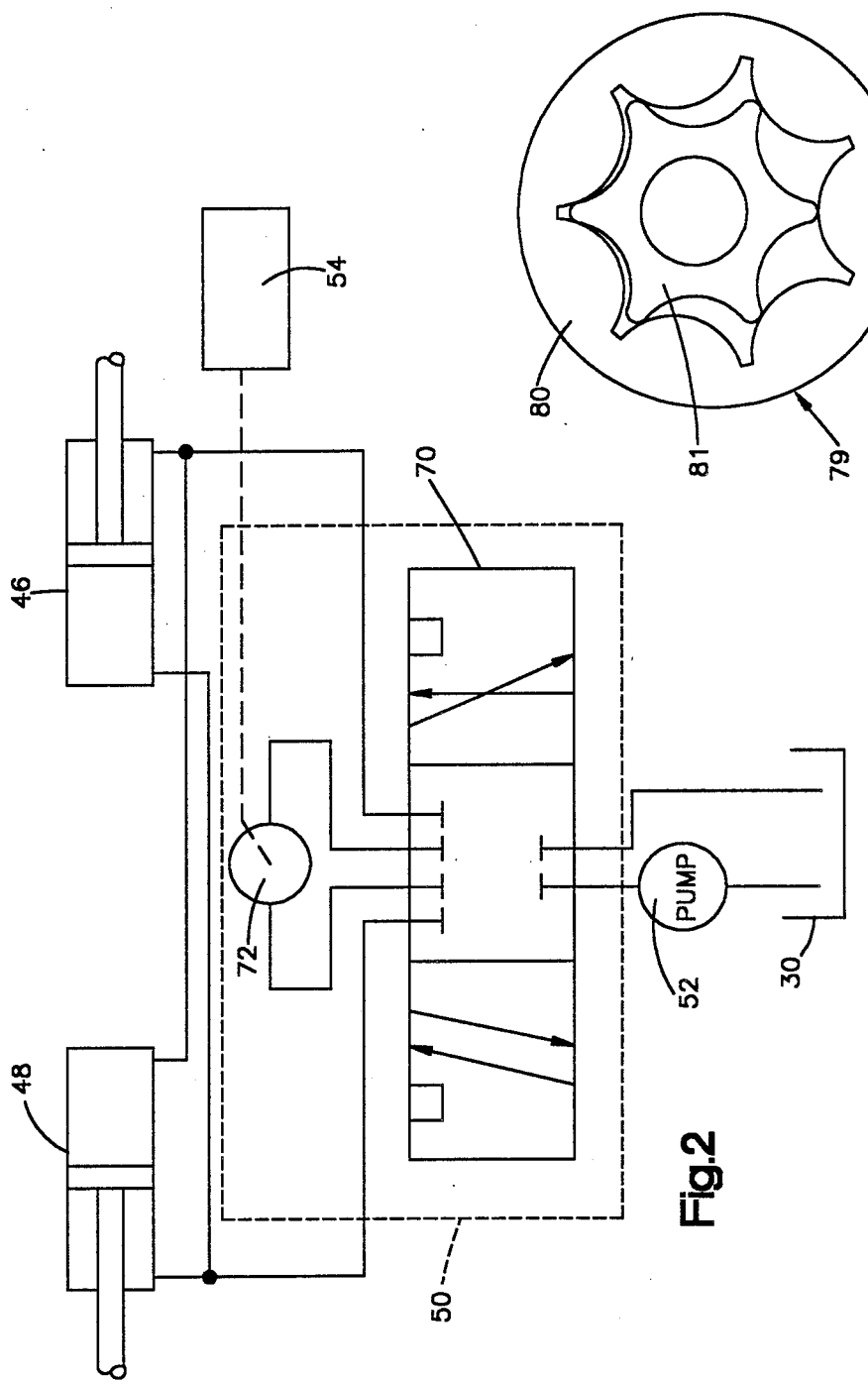

VEHICLE STEERING SYSTEM

TECHNICAL FIELD

The present invention relates to a vehicle steering system, and is particularly directed to a vehicle steering system having more than one set of steerable wheels.

BACKGROUND OF THE INVENTION

Vehicle steering systems having more than one set of steerable wheels are known. Typically, such a steering system includes a front set of steerable wheels and a rear set of steerable wheels, both of which are controlled in response to turning of the vehicle steering wheel. A steering system having more than one set of steerable wheels is particularly useful in a large vehicle such as a truck so as to increase steering maneuverability.

A known steering system having front steerable wheels and rear steerable wheels includes a front wheel steering mechanism operatively connected with the front steerable wheels and a rear wheel steering mechanism operatively connected with the rear steerable wheels. The front wheel steering mechanism operates in response to turning of a steering member such as a steering wheel. The front steerable wheels are steered in response to operation of the front wheel steering mechanism. The front wheel steering mechanism is mechanically drivingly connected to the rear wheel steering mechanism to operate the rear wheel steering mechanism. The rear steerable wheels are steered in response to operation of the rear wheel steering mechanism.

Another known steering system having front steerable wheels and rear steerable wheels includes a hydraulic steering motor operatively connected with the rear steerable wheels. The hydraulic steering motor is connected in fluid communication with an actuatable electrohydraulic valve. The electrohydraulic valve when actuated directs hydraulic fluid to the hydraulic steering motor. Operation of the electrohydraulic valve is controlled by an electrical signal generated in response to turning of a steering member such as a vehicle steering wheel.

Still another known steering system having front steerable wheels and rear steerable wheels includes an electric motor which, when actuated, moves a mechanism for turning the rear steerable wheels. The rotation of the output shaft of the electric motor is controlled in response to an output signal from a control device such as a microcomputer. The microcomputer monitors a number of signals indicative of vehicle operating parameters and generates its output signal to control the electric motor in response to these monitored signals.

SUMMARY OF THE INVENTION

The present invention is directed to a vehicle steering system having more than one set of steerable wheels. A steering system constructed in accordance with the present invention is particularly suitable for steering a set of rear steerable wheels of a truck or trailer.

In a preferred embodiment of the present invention, the vehicle has a front set of steerable wheels and a rear set of steerable wheels which are steered in response to turning of a steering wheel. The rear steerable wheels are turned by a pair of actuatable hydraulic steering motors operatively connected with the rear steerable wheels. The hydraulic steering motors are actuated when hydraulic fluid pressure is applied to the hydraulic steering motors.

A hydrostatic steering unit is connected in fluid communication with the hydraulic steering motors. The hydrostatic steering unit includes a metering unit for metering fluid flow to the steering motors and a directional control valve for directing the metered flow to the steering motors and for directing flow from the steering motors to a fluid reservoir. The hydrostatic steering unit has an input shaft drivingly coupled with an output shaft of a suitable motor, such as a DC electric motor. The speed and direction of rotation of the output shaft of the DC electric motor, and hence the speed and direction of rotation of the input shaft of the hydrostatic steering unit, varies as a function of control output signals from a microcomputer. The input shaft of the hydrostatic steering unit drives the metering unit. Thus, the speed of the electric motor controls the rate of fluid flow to the steering motors for the rear steerable wheels.

The microcomputer monitors signals from a vehicle speed sensor, a front wheel position sensor and a rear wheel position sensor. In response to these monitored signals, the microcomputer generates the control output signals to control the speed and direction of rotation of the output shaft of the electric motor. The speed of the output shaft of the DC motor varies as a function of the vehicle speed, the position of the front wheels, and the position of the rear wheels. The direction of rotation of the output shaft of the DC electric motor depends only upon the inputs to the microcomputer.

Since the output shaft of the DC electric motor is drivingly coupled with the input shaft of the hydrostatic steering unit, the speed and direction of rotation of the input shaft of the hydrostatic steering unit varies directly as a function of the speed and direction of rotation of the output shaft of the DC electric motor. The rate of fluid flow to the hydraulic steering motors is proportional to the speed of rotation of the input shaft of the hydrostatic steering unit. The direction of the hydraulic fluid flow applied to the hydraulic steering motors depends upon the direction of rotation of the input shaft of the hydrostatic steering unit. Thus, operation of the hydraulic steering motors varies as a function of the vehicle speed, and the positions of the front and rear steerable wheels.

BRIEF DESCRIPTION OF THE DRAWINGS

Further features of the present invention will become apparent to those skilled in the art to which the present invention relates from reading the following specification with reference to the accompanying drawings, in which:

FIG. 2 is a schematic representation of a portion of the system of FIG. 1; and

FIG. 3 is a schematic view of a part of a hydrostatic steering unit in the system of FIG. 1.

DESCRIPTION OF A PREFERRED EMBODIMENT

Figure 1:
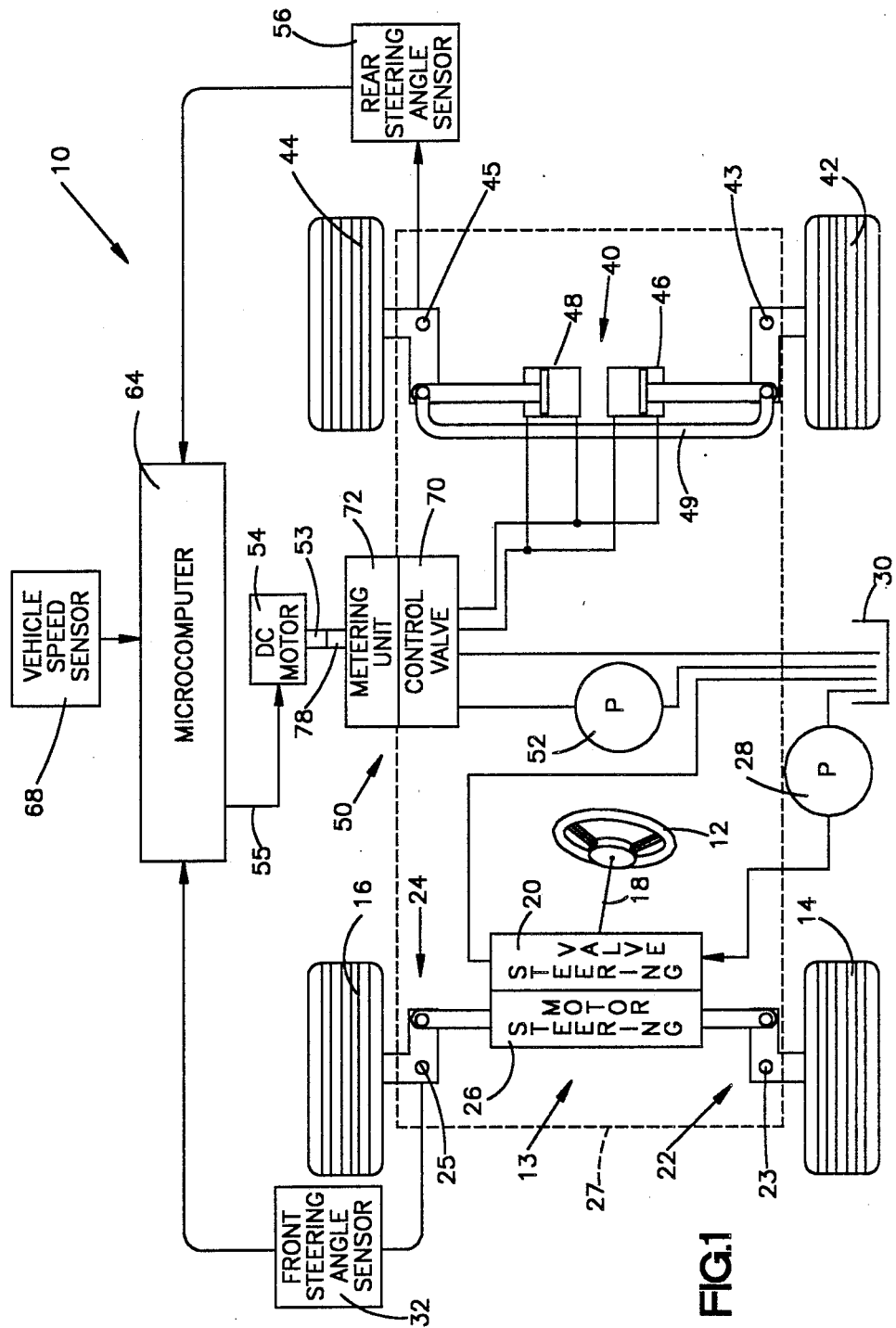
FIG. 1 is a schematic block diagram of a vehicle steering system constructed in accordance with the present invention.

A vehicle steering system 10 constructed in accordance with the present invention is illustrated in FIG. 1. The steering system 10 includes a steering wheel 12 operatively connected through an input shaft 18 to a front wheel steering assembly 13. The front wheel steering assembly 13 is connected through steering linkages with a front set of steerable wheels 14, 16. The front steerable wheels 14, 16 are pivotably mounted on king pins 23, 25, respectively. The king pins 23, 25 are supported by the vehicle frame 27.

The front steering assembly 13 includes a steering valve 20 operatively connected with a hydraulic steering motor 26 to control fluid flow to and from the steering motor 26. The steering valve 20 is actuated upon turning of the steering wheel 12. The hydraulic steering motor 26 is connected in fluid communication with the outlet port of a first hydraulic pump 28. The inlet port of the first pump 28 is connected in fluid communication with a fluid reservoir 30. The hydraulic steering motor 26 is operatively coupled to the front steerable wheels 14, 16 to aid the vehicle operator in turning the front steerable wheels 14, 16 upon application of steering torque to the steering wheel 12. The hydraulic steering motor 26 and steering valve 20 can be of any one of several types known in the art.

A front steering angle sensor 32 senses the steering angle of the front steerable wheels 14, 16. Such a steering angle sensor is known in the art and is therefore not described herein in detail. One type of steering angle sensor contemplated includes a potentiometer having one portion connected to the vehicle frame 27 and a second portion connected to a portion of the steering linkage that pivots with steering movement of the front steerable wheels 14, 16. Upon pivotal movement of the front steerable wheels 14, 16, the impedance of the potentiometer varies as a function of the steering angle of the front steerable wheels 14, 16.

The steering system 10 further includes a rear wheel steering assembly 40 connected in force transmitting engagement through appropriate steering linkages with a rear set of steerable wheels 42, 44. The rear set of steerable wheels 42, 44 may be on a trailer or, as shown herein, may be the rear wheels of a vehicle, such as a truck. The rear steerable wheels 42, 44 are mounted in tandem behind the front steerable wheels 14, 16. The rear steerable wheels 42, 44 are mounted so as to pivot about king pins 43, 45, respectively. The king pins 43, 45 are supported by the vehicle frame 27. The rear steering assembly 40 includes a pair of hydraulic steering motors 46, 48 operatively connected with the rear steerable wheels 42, 44, respectively. A tie rod 49 connects the two rear steerable wheels 42, 44 so that they move together.

A rear steering angle sensor 56 senses the steering angle of the rear steerable wheels 42, 44 relative to a straight-ahead direction and provides an electrical signal indicative thereof. Any of several types of steering angle sensors can be used for the rear steering angle sensor 56. One type of steering angle sensor contemplated includes a potentiometer having one portion connected to the vehicle frame 27 and a second portion connected to a portion of the steering linkage that pivots with steering movement of the rear steerable wheels 42, 44. Upon pivotal movement of the rear steerable wheels 42, 44, the impedance of the potentiometer varies as a function of their steering angle.

The vehicle steering system 10 also includes a vehicle speed sensor 68. The vehicle speed sensor 68 senses the ground speed of the vehicle and provides an electrical signal indicative thereof.

A hydrostatic steering unit 50 meters fluid flow to the pair of hydraulic steering motors 46, 48 to control steering movement of the rear steerable wheels 42, 44. The hydrostatic steering unit 50 includes a control valve 70 and a metering unit 72 (shown schematically in FIG. 2). The hydrostatic steering unit 50 further includes an input shaft 78. The input shaft 78 is coupled to the metering unit 72 and drives the metering unit 72 upon rotation of the input shaft 78. The input shaft 78 is also coupled by the metering unit 72 to the control valve 70. Upon rotation of the input shaft 78, the control valve 70 directs fluid flow to the pair of hydraulic steering motors 46, 48 to effect steering in a direction depending upon the direction of actuation of the control valve 70.

The metering unit 72 includes a gerotor gear type metering mechanism 79 shown in FIG. 3 having an outer gerotor gear member 80 and an inner gerotor gear member 81 which have relative rotational and orbital movement. Such gerotor gear metering mechanisms are well known and will not be described in detail. The input shaft 78 rotates the gerotor gear member 80 resulting in relative orbital and rotational movement of the gear member 81. The teeth of the gear members 80, 81 define fluid pockets. As the gear members 80, 81 rotate and orbit, fluid flows through the metering unit 72. A hydrostatic steering unit having a structure as described hereinabove is fully described in U.S. Pat. No. 4,232,708 entitled "Fluid Controller" to Miller, assigned to the assignee of the present application, which patent disclosure is hereby fully incorporated herein by reference.

When no torque is applied to the input shaft 78, the control valve 70 is normally biased to a neutral condition in which no fluid flows through the control valve 70 to the metering unit 72. When a torque is applied to the input shaft 78, the control valve 70 is moved to an operating condition in which fluid is allowed to flow from a second hydraulic pump 52 through the control valve 70 to the metering unit 72. The direction of flow and the amount of fluid flowing into and out of the metering unit 72 depends upon the direction of rotation and speed of rotation of the input shaft 78, as is known.

The control valve 70 of the hydrostatic steering unit 50 is connected in fluid communication with not only the metering unit 72 but also the pair of hydraulic steering motors 46, 48. The control valve 70 receives metered flow from the metering unit 72 and directs that flow to the steering motors 46, 48. The control valve 70 also receives fluid from the steering motors 46, 48 and directs that flow to the fluid reservoir 30.

The input shaft 78 of the hydrostatic steering unit 50 is drivingly connected with an output shaft 53 of a DC electric motor 54. The input shaft 78 rotates and actuates the hydrostatic steering unit 50. The rate and direction of fluid flow to the pair of hydraulic steering motors 46, 48 varies as a function of the speed and direction of rotation of the input shaft 78 of the hydraulic steering unit 50, and hence the speed and direction of rotation of the output shaft 53 of the DC motor 54. The speed and direction of rotation of the output shaft 53 of the DC motor 54 is controlled in response to a control signal 55 from a microcomputer 64.

The microcomputer 64 monitors the output of the vehicle speed sensor 68, the output of the front steering angle sensor 32, and the output of the rear steering angle sensor 56. The microcomputer 64 generates the control signal 55 in response to the output signals from the vehicle speed sensor 68, the front steering angle sensor 32, and the rear steering angle sensor 56. The control signal 55 is generated in accordance with a preprogrammed procedure stored in an internal memory of the microcomputer 64. Microcomputers are readily available in the commercial market. Their internal structure and operation are well known in the art and, therefore, the microcomputer 64 will not be described in detail herein.

When the steering wheel 12 is in a straight position, the output shaft 53 of the DC motor 54 is not rotating. The control valve 70 of the hydrostatic steering unit 50 is in the neutral condition in which no fluid flow is directed from the control valve 70 to the metering unit 72. When the steering wheel 12 is turned in one steering direction, the microcomputer 64 signals the DC motor 54 to rotate its output shaft 53 in one direction. When the steering wheel 12 is turned in the other steering direction, the microcomputer 64 signals the DC motor 54 to rotate its output shaft 53 in the other direction. Since the output shaft 53 of the DC motor 54 is drivingly coupled with the input shaft 78 of the hydrostatic steering unit 50, the input shaft 78 of the hydrostatic steering unit 50 rotates at the same speed and in the same direction as the output shaft 53 of the DC motor 54.

When the input shaft 78 of the hydrostatic steering unit 50 rotates in one direction, the control valve 70 is moved away from the neutral condition shown in FIG. 2 to the right or left to one operating condition in which fluid flow is directed from the second pump 52 through the control valve 70 to the metering unit 72 in one direction. When the input shaft 78 rotates in the other direction, the control valve 70 is moved to another operating condition in which fluid flow is directed from the second pump 52 through the control valve 70 to the metering unit 72 in the opposite direction. The direction of fluid flow to the metering unit 72 depends upon which operating condition the control valve 70 is in. The metering unit 72 meters fluid flow from the second pump 52, and that flow is directed through the control valve 70 to the hydraulic steering motors 46, 48. The fluid flow directed to the hydraulic steering motors 46, 48 effects steering movement of the rear steerable wheels 42, 44.

The flow to the hydraulic steering motors 46, 48 is proportional to the speed of rotation of the input shaft 78. The direction of the hydraulic pressure applied to the hydraulic steering motors 46, 48 depends upon the direction of rotation of the input shaft 78. The speed and direction of rotation of the input shaft 78 depend upon the vehicle speed, the position of the front steerable wheels 14, 16, the position of the rear steerable wheels 42, 44 and the magnitude and direction of steering torque applied to the steering wheel 12. Thus, operation of the hydraulic steering motors 46, 48, and hence steering of the rear steerable wheels 42, 44, is controlled in response to the vehicle speed, the position of the front steerable wheels 14, 16, the position of the rear steerable wheels 42, 44, and the magnitude and direction of steering torque applied to the steering wheel 12.

After the front steerable wheels 14, 16 and the rear steerable wheels 42, 44 have been steered in one direction to a desired position, the steering wheel 12 may be held to maintain the front steerable wheels 14, 16 and the rear steerable wheels 42, 44 in this desired position, or the steering wheel 12 may be turned in the opposite direction to effect steering movement of the front steerable wheels 14, 16 and the rear steerable wheels 42, 44 in the opposite direction. If the steering wheel 12 is held to maintain the front steerable wheels 14, 16 and the rear steerable wheels 42, 44 in the desired position, the microcomputer 64 generates the control signal 55 to deactuate the DC motor 54. When the DC motor 54 deactuates, the output shaft 53 of the DC motor 54 and the input shaft 78 of the hydrostatic steering unit 50 stop rotating. The control valve 70 returns from the one operating condition to its biased, neutral condition in which no fluid flows through the control valve 70 to the metering unit 72. Thus, fluid flow to the steering motors 46, 48 ceases when the steering wheel 12 is held to maintain the front steerable wheels 14, 16 and the rear steerable wheels 42, 44 in the desired turned position.

If the steering wheel 12 is turned in either direction, the microcomputer 64 generates the control signal 55 to turn the output shaft 53 of the DC motor 54 and the input shaft 78 of the hydrostatic steering unit 50 in the direction programmed into the microcomputer 64. The control valve 70 moves to the operating condition in which fluid flows through the control valve 70 to the metering unit 72 in the selected direction.

This invention has been described above with reference to a preferred embodiment. Modifications and alterations may become apparent to one skilled in the art upon reading and understanding this specification. It is intended to include all such modifications and alterations within the scope of the appended claims.

Having described a specific preferred embodiment of the invention, the following is claimed:

1. A steering system for a vehicle having a front set of steerable wheels and a rear set of steerable wheels arranged in tandem, said steering system comprising:

a front steering assembly connected to the front set of steerable wheels and to a steering wheel of the vehicle, said front steering assembly effecting steering movement of the front set of steerable wheels in response to turning of the vehicle steering wheel;

actuatable hydraulic cylinder means connected in force transmitting engagement with the rear set of steerable wheels for, when actuated, steering the rear set of steerable wheels, said hydraulic cylinder means being actuated when hydraulic fluid is applied thereto in response to turning of the vehicle steering wheel;

a hydrostatic steering unit connected in fluid communication with said hydraulic cylinder means for applying hydraulic fluid to said hydraulic cylinder means when actuated, said hydrostatic steering unit having an input shaft rotatable about its longitudinal central axis, said input shaft rotating in one direction to apply hydraulic fluid to said hydraulic cylinder means to effect steering movement of the rear set of steerable wheels in one direction and rotating in the opposite direction to apply hydraulic fluid to said hydraulic cylinder means to effect steering movement of the rear set of steerable wheels in the opposite direction;

an electric motor having an output shaft drivingly connected with said input shaft of said hydrostatic steering unit, and control means connected with said electric motor for controlling the speed and direction of rotation of said output shaft of said electric motor and thereby steering movement of the rear set of steerable wheels.

2. The steering system of claim 1 further including means for sensing vehicle speed and providing a first signal indicative thereof, said control means controlling the speed and direction of rotation of said output shaft of said electric motor in response to said first signal.

3. The steering system of claim 2 further including means for sensing the position of the front set of steerable wheels and providing a second signal indicative thereof, said control means controlling the speed and direction of said output shaft of said electric motor in response to said second signal.

4. The steering system of claim 3 further including means for sensing the position of the rear set of steerable wheels and providing a third signal indicative thereof, said control means controlling the speed and direction of said output shaft of said electric motor in response to said third signal.

5. The steering system of claim 1 wherein said control means includes a microcomputer for generating a control output signal to control the speed and direction of rotation of said output shaft of said electric motor.

6. The steering system of claim 1 wherein said hydrostatic steering unit includes a metering second for metering fluid flow to said hydraulic cylinder means when actuated and a control valve connected in fluid communication with said metering section, said control valve being movable between a neutral condition in which no fluid flow is directed to said metering section and an operating condition in which fluid flows to said metering section.

7. The steering system of claim 6 wherein said metering section includes a gerotor gear type metering mechanism having an outer gerotor gear member and an inner gerotor gear member which have relative rotational and orbital movement.

* * * * *

UNITED STATES PATENT AND TRADEMARK OFFICE
CERTIFICATE OF CORRECTION

PATENT NO. : 4,972,916

DATED : November 27, 1990

INVENTOR(S) : Laurence L. Miller

It is certified that error appears in the above-identified patent and that said Letters Patent is hereby corrected as shown below:

Column 8, Line 4, Claim 6, change "second" to --section--.

Signed and Sealed this

Thirty-first Day of March, 1992

Attest:

HARRY F. MANBECK, JR.

Attesting Officer

Commissioner of Patents and Trademarks